Patented June 9, 1931

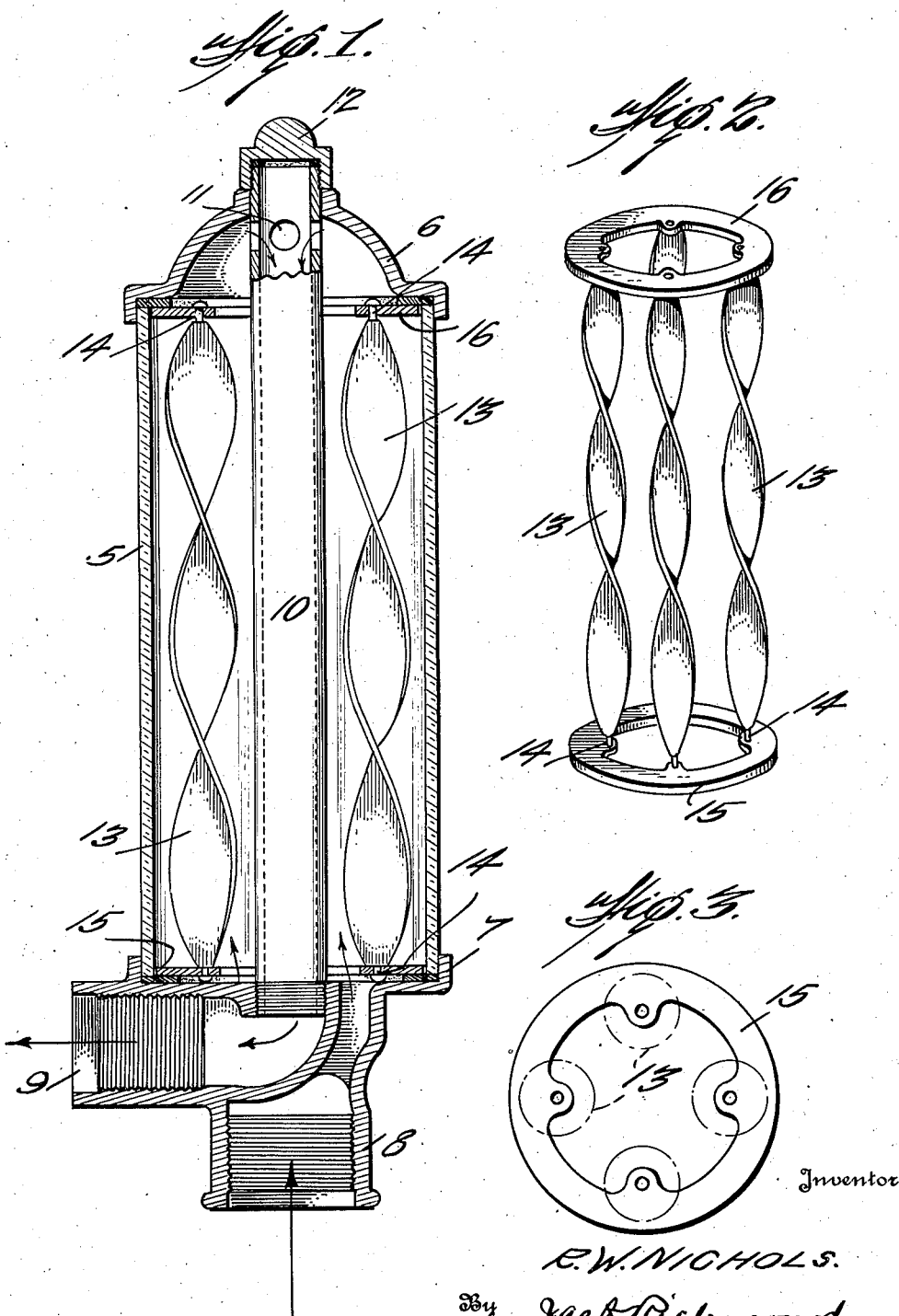

1,809,350

UNITED STATES PATENT OFFICE

ROSCOE W. NICHOLS, OF MAYWOOD, ILLINOIS, ASSIGNOR TO OIL PRODUCTS APPLIANCE CO., OF MAYWOOD, ILLINOIS, A CORPORATION OF ILLINOIS

FLOW INDICATOR FOR OIL DISPLAY PUMPS

Application filed April 14, 1930. Serial No. 444,220.

My invention relates to oil display pumps and particularly to pumps which include a sight glass or transparent casing for displaying quality and kind of oil, and a device or devices in the path of the fluid and visible through the glass for indicating the presence or absence of fluid flow.

The invention primarily is addressed to the flow indicating feature and its object is to provide a simple, efficient and inexpensive flow indicator so constructed, adapted and arranged as to provide, in response to fluid flow, highly illusory effects of beautiful and startling nature simulating under daylight rippling, fluttering, or continuous wave effects and under nightfall, continuous or never ending flame in rapid upward flight, and which, while embodying a plurality of parts, nevertheless is self-contained and capable of being applied and removed as a unit.

The nature of the invention consists in the provision of an indicator in the path of fluid flow and responsive to fluid flow and embodying a plurality of metal strands or ribbons in parallel order of arrangement and each having a helical twist in the direction of its length and mounted at its ends for free rotative movement whereby, in response to fluid flow, a highly startling and pleasing, albeit illusory, effect is produced of an endless object or objects, in rapid flight, the effect being amplified or heightened by using bright and contrasting surfaces as is contemplated.

The invention in its preferred embodiment is illustrated in the accompanying drawings, wherein,—

Figure 1 is a sectional elevational view of a sight glass containing my improvements.

Fig. 2 is a perspective view of the flow indicator, showing its self-contained characteristic.

Fig. 3 is a structural detail.

In the drawings, 5 represents a sight glass or transparent casing properly mounted and secured by end supports 6 and 7 whereof the latter is a fitting having an inlet 8 for attachment to the delivery arm of the usual measuring and dispensing pump, and having an outlet 9 which receives the usual discharge nozzle. The outlet 9 communicates with a conduit 10 ranging axially of the casing and in communication therewith near its upper end through the medium of a port 11. The element 10, aside from its office as a conduit to convey fluid from the casing to the discharge nozzle, also is effective to center the parts and its end extends beyond the head 6 and receives a retaining cap 12. It will be understood that fluid enters at the bottom of the casing and is discharged near the top thereof and passes downwardly through the conduit 10 to the outlet 9.

In accordance with my inventive thought I provide in the path of fluid flow and for the full effective visibility of the casing objects which of themselves and in association with each other will respond to fluid flow to produce the highly illusory and pleasing effect of, according to different conditions, a continuous streak of light or of rippling wave effects, or an endless chain of flashing, all of which are calculated to attract the attention of the customer and to indicate that fluid is draining. Under the preferred practice the devices for producing the illusory effects stated are established by twisting rectangular strips of resilient metal to form a series of flights 13, the twisted strips or ribbons terminating in pins 14 so as to be susceptible of independent mounting in the respective ends of the casing. The illusory effects can be greatly magnified by using bright metal or by surfacing black metal with, for example, chromium or with pigments of contrasting color.

It is a merit of the invention that the flights are mounted so that they can be introduced into or removed from the casing as a unit assembly. This aptly is shown in Fig. 2 which represents a flow indicator in the form of a cage or self-contained unit, the twisted strands or ribbons being endwise mounted for rotation, in headers or end rings 15 and 16.

Having described my invention, I claim,—

A fluid flow indicator designed to be arranged in a transparent casing, including an upper ring, a lower ring, each of said rings corresponding to the internal diameter of the casing, and a series of whirligigs independently mounted in and freely rotatable with respect to both the upper and lower rings.

In testimony whereof I affix my signature.

ROSCOE W. NICHOLS.